United States Patent Office 3,434,969
Patented Mar. 25, 1969

3,434,969
SCALE INHIBITING
Paul H. Ralston, Bethel Park, Pa., assignor to
Calgon Corporation
No Drawing. Filed Aug. 11, 1967, Ser. No. 659,850
Int. Cl. C02b 5/06; C07f 9/38
U.S. Cl. 210—58                                    10 Claims

ABSTRACT OF THE DISCLOSURE

Compounds containing a plurality of methylene phosphonated amine groups having at least three nitrogens connected by ethylene groups are disclosed to inhibit the formation of scale, such as calcium, barium and magnesium carbonate, silicate and sulphate scales, from aqueous solutions, even at relatively high temperatures, at threshold inhibitor concentrations.

BACKGROUND OF THE INVENTION

Most commercial water contains alkaline earth metal cations, such as calcium, barium, magnesium, etc., and anions such as bicarbonate, carbonate, sulfate, oxalate, phosphate, silicate, fluoride, etc. When combinations of these anions and cations are present in concentrations which exceed the solubility of their reaction products, precipitates form until their product solubility concentrations are no longer exceeded. For example, when the concentrations of calcium ion and carbonate ion exceed the solubility of the calcium carbonate reaction product, a solid phase of calcium carbonate will form as a precipitate.

Solubility product concentrations are exceeded for various reasons, such as evaporation of the water phase, change in pH, pressure or temperature, and the introduction of additional ions which can form insoluble compounds with the ions already present in the solution.

As these reaction products precipitate on the surfaces of the water-carrying system, they form scale. The scale prevents effective heat transfer, interferes with fluid flow, facilitates corrosive processes, and harbors bacteria. Scale is an expensive problem in many industrial water systems, causing delays and shutdowns for cleaning and removal.

Scale-forming compounds can be prevented from precipitating by inactivating their cations with chelating or sequestering agents, so that the solubility of their reaction products is not exceeded. Generally, this approach requires many times as much chelating or sequestering agent as cation present, and the use of large amounts of treating agent is seldom desirable or economical.

More than twenty-five years ago it was discovered that certain inorganic polyphosphates would prevent such precipitation when added in amounts far less than the concentrations needed for sequestering or chelating. See, for example, Hatch and Rice, "Industrial Engineering Chemistry," vol. 31, p. 51, at 53; Reitemeier and Buehrer, "Journal of Physical Chemistry," vol. 44, No. 5, p. 535 at 536 (May 1940); Fink and Richardson U.S. Patent 2,358,222; and Hatch U.S. Patent 2,539,305. When a precipitation inhibitor is present in a potentially scale-forming system at a markedly lower concentration than that required for sequestering the scale forming cation, it is said to be present in "threshold" amounts. Generally, sequestering takes place at a weight ratio of threshold active compound to scale-forming cation component of greater than about ten to one, and threshold inhibition generally takes place at a weight ratio of threshold active compound to scale-forming cation component of less than about 0.5 to 1.

The "threshold" concentration range can be demonstrated in the following manner. When a typical scale-forming solution containing the cation of a relatively insoluble compound is added to a solution containing the anion of the relatively insoluble compound and a very small amount of a threshold active inhibitor, the relatively insoluble compound will not precipitate even when its normal equilibrium concentration has been exceeded. If more of the threshold active compound is added, a concentration is reached where turbidity or a precipitate of uncertain composition results. As still more of the threshold active compound is added, the solution again becomes clear. This is due to the fact that threshold active compounds in high concentrations also act as sequestering agents, although sequestering agents are not necessarily "threshold" compounds. Thus, there is an intermediate zone between the high concentrations at which threshold active compounds sequester the cations of relatively insoluble compounds and the low concentrations at which they act as threshold inhibitors. Therefore, one could also define "threshold" concentrations as all concentrations of threshold active compounds below that concentration at which this turbid zone or precipitate is formed. Generally the threshold active compound will be used in a weight ratio of the compound to the cation component of the scale-forming salts which does not exceed about 1.

The polyphosphates are generally effective threshold inhibitors for many scale-forming compounds at temperatures below 100° F. But after prolonged periods at higher temperatures, they lose some of their effectiveness. Moreover, in an acid solution, they revert to ineffective or less effective compounds.

A compound that has sequestering powers does not predictably have threshold inhibiting properties. For example, ethylene diamine tetracetic acid salts are powerful sequesterants but have no threshold activities.

As disclosed in my commonly assigned copending application Ser. No. 409,300, filed on Nov. 5, 1964, now U.S. Patent No. 3,336,221, N-(methylene phosphonate) amines of the formula:

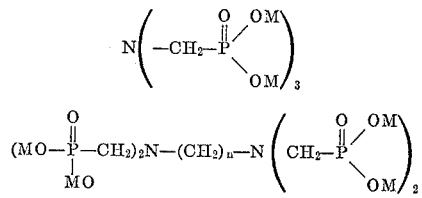

wherein M is H, NH₄, alkali metal, or combinations thereof and $n$, 1, 2 or 3, are effective threshold inhibitors. The disclosure of this application is hereby incorporated by reference.

Netherlands Patents 6407908 and 6505237 disclose the preparation of amino(lower) alkylene phosphonic acids, such as amino tri(methylene phosphonic acid). The disclosed process involves the reaction of certain nitrogenous compounds, such as ammonia, with phosphorous acid and an aldehyde or a ketone. A second reference for the preparation of amino alkylene phosphonic acid is Journal of Organic Chemistry, vol. 31, No. 5, 1603–1607, (May 1966). These references are hereby incorporated by reference.

SUMMARY OF THE INVENTION

The present invention is a process for inhibiting the formation of scale such as calcium, barium and magnesium carbonate, sulfate, and silicate scale, even at relatively high temperatures. These scales are inhibited by using threshold amounts of a water-soluble polyphosphometholated poly (ethylene amine) compound containing 3 to 15 amine groups.

Scale formation from aqueous solutions containing a wide variety of scale forming compounds, such as calcium, barium and magnesium carbonate, sulfate, silicate, oxalates, phosphates, hydroxides, fluorides and the like are inhibited by the use of threshold amounts of polyamines containing 3 to 15 primary or secondary nitrogen atoms, wherein at least 50% of the active hydrogen atoms on the nitrogen atoms have been replaced by methylene phosphonate radicals. The poly(ethylene N-methylene phosphonate) compounds are effective in small amounts, such as less than 100 p.p.m., and are preferably used in concentrations of less than 25 p.p.m.

The poly (N-methylene phosphonate) polyethyleneamine compounds may be produced by the Mannich reaction of a polyamine containing 3 to 15 nitrogen atoms with formaldehyde and phosphorus acid, according to the following reaction:

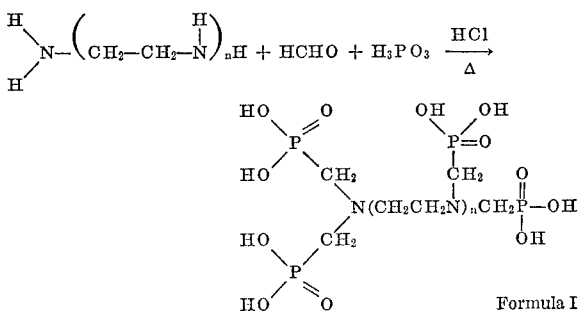

Formula I wherein $n$ is 2 to 14.

The reaction is quite exothermic and initial cooling will generally be required. Once the reaction is well under way, heat may be required to maintain refluxing conditions. While the reaction will proceed at temperatures over a wide range, i.e., from 80 to 150° C., it is preferred that the temperatures of the reaction medium be maintained at the refluxing temperatures. The reaction is preferably conducted at atmospheric pressure, although subatmospheric and superatmospheric pressures may be utilized if desired. Reaction times will vary, depending upon a number of variables, but the preferred reaction time is 1 to 5 hours, and the most preferred reaction time is 2½ to 3½ hours.

Although the phosphonic acid or the formaldehyde may be added in either order, or together to the reaction mixture, it is preferred to all all of the phosphonic acid to the polyamine and then to slowly add the formaldehyde under refluxing conditions. Generally, about ½ to 10 moles or more of formaldehyde and about ½ to 10 moles or more of phosphonic acid can be used per mole equivalent of amine, although the most preferred molar equivalent ratios of formaldehyde: phosphonic acid: amine is 1:1:1. Excess formaldehyde and/or phosphonic acid function essentially as solvents, and thus there is no real upper limit on the amount of these materials which may be used, per mole equivalent of amine, although such excess amounts naturally add to the cost of the final product and are therefore not preferred. The preferred molar equivalent ratios are ½ to 2 moles each of the formaldehyde and phosphonic acid per mole equivalent of amine.

The Mannich reaction will proceed in the presence or the absence of solvents. The reaction may be carried out as a liquid-phase reaction in the absence of solvents or diluents, but is preferred that the reaction be carried out in an aqueous solution containing from about 40 to about 50% of the reaction monomers. Preferred conditions for the Mannich reaction include the use of formaldehyde based on the molar equivalent amount of the amine compound, the use of a stoichiometric amount of phosphonic acid based on the molar equivalent amount of amine (e.g., on the amine active hydrogen content), refluxing conditions and a pH of less than 2 and preferably less than 1.

The preferred amines to be used in the preparation of the threshold inhibitors of the present invention are essentially linear poly (ethylene amines). These compounds react readily in the Mannich reaction.

The scale inhibitors of the present invention are of the following general formula:

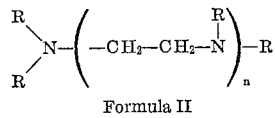

Formula II wherein each R is independently selected from the group consisting of hydrogen and

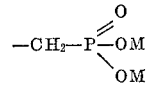

provided, however, that at least half of the radicals represented by R are

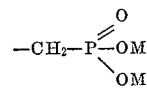

and $n$ is an integer of 2 to 14 and M indicates that the inhibitor is in water-soluble form. Typically, M will be independently selected from the group consisting of hydrogen, alkali metals, ammonium, alkaline earth metals, and zinc. The preferred scale inhibitors of the present invention are N-methylene phosphonated diethylene triamines of the general formula:

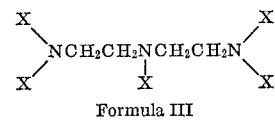

Formula III wherein each X is independently selected from the group consisting of hydrogen and

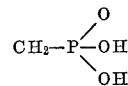

and at least four of the radicals represented by X are

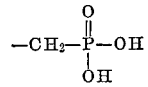

and water-soluble salts thereof. Other suitable polyamine compounds include, for example, triethylene tetramine, tetraethylene pentamine and pentaethylene hexamine, and a product sold by the Dow Chemical Company under the trade name "Amine E-100." Amine E-100 is the still bottoms from a polyalkylene polyamine process with the following approximate compositions:

|  | Percent |
|---|---|
| Tetraethylenepentamine ($H_2N(CH_2CH_2NH)_4H$) | 10 |
| Pentaethylenehexamine ($H_2N(CH_2CH_2NH)_5H$) | 40 |
| Cyclics (piperazines) | 20 |
| Branched structure | 20 |
| Polymers (chains with more than five ethylene amine groups) | 10 |

Another suitable amine is a polyethyleneimine having an average molecular weight of 600, available from Dow Chemical Co. under the trademark "Montrex 600."

While obviously the degree of phosphomethylolation can be varied by the proper selection of the molar ratios of the starting material, for maximum utility it has generally been preferred to achieve the maximum degree (i.e., 100%) of the phosphomethylolation. For example, 8 methylene phosphonate groups on pentaethylene hexamine are preferred. However, products with less than the maximum degree of phosphomethylolation are useful and such products with at least 80%, and in some cases 50%, of phosphomethylolation are within the scope of the present invention. The degree of phosphomethylolation required for effective scale inhibition varies with the number of nitrogen atoms in the amine molecule. As mentioned, complete phosphomethylolation—e.g., a complete replacement of the active hydrogen atoms on the nitrogen atoms by methylene phosphonate groups—is most preferred. A minimum of 80% phosphomethylolation of diethylene triamine is desirable (i.e., at least 4 of the 5 active hydrogen atoms are replaced by methylene phosphonate groups) for practical scale inhibition. In the case of pentaethylene hexamine, 50% phosphomethylolation will produce acceptable scale inhibition.

The poly(ethylene N-methylene phosphonate) compounds of the present invention (e.g., the acid form of the compounds) may be readily converted into the corresponding alkali metal, ammonium or alkaline earth metal salts by replacing at least half of the hydrogen ions in the phosphonic acid group with the appropriate ions, such as the potassium ion or ammonium or with alkaline earth metal ions. Penta (methylene phosphonate) diethylene triamine, for example (see Formula III), may be converted into the corresponding sodium salt by the addition of sodium hydroxide. If the pH of the amine compound is adjusted to 7.0 by the addition of caustic soda, about one half of the —OH radicals on the phosphorous atoms will be converted into the sodium salt form.

The scale inhibitors of the present invention illustrate improved inhibiting effect at high temperatures when compared to prior art compounds. The compounds of the present invention will inhibit the deposition of scale-forming alkaline earth metal compounds on a surface in contact with aqueous solution of the alkaline earth metal compounds over a wide temperature range. Generally, the temperatures of the aqueous solution will be at least 40° F., although significantly lower temperatures will often be encountered. The preferred temperature range for inhibition of scale deposition is from about 130 to about 350° F. The aqueous solutions or brines requiring treatment generally contain about 50 p.p.m. to about 50,000 p.p.m. of scale-forming salts. The compounds of the present invention effectively inhibit scale formation when present in an amount of from 0.1 to about 100 p.p.m., and preferably 0.2 to 25 p.p.m. wherein the amounts of the inhibitor are based upon the total aqueous system. There does not appear to be a concentration below which the compounds of the present invention are totally ineffective. A vary small amount of poly (ethylene N-methylene phosphonate) scale inhibitor is effective to a correspondingly limited degree, and the threshold effect is obtained with less than 0.1 p.p.m. of penta (methylene phosphonated) form of Formula III. There is no reason to believe that this is the minimum effective concentration. The scale inhibitors of the present invention are effective in both brine, such as sea water, and acid solutions.

An additional, unexpected advantage in penta methylene phosphonated Formula III and the other scale inhibitors of the present invention over scale inhibitors of the prior art is improved solubility. It has been found that the phosphomethylolated polyamines containing 3 to 6 nitrogen atoms are completely stable in the acidic form at 50% solids, and are also stable in the sodium salt form.

Numerous experiments were performed to demonstrate the effectiveness of the poly (ethylene N-methylene phosphonate) scale inhibitors of the present invention. In these experiments, solutions of two readily soluble salts were mixed in the presence of the scale inhibitor to form a solution containing a relatively insoluble salt at several times its equilibrium concentration. As a control, each experiment was also conducted in the absence of a scale inhibitor.

By analyzing a small amount of an aqueous solution to determine the concentration of one of its soluble components the amount of precipitate formed in the solution at a particular time may be calculated. The well-known Schwarzenbach titration may be used to determine the level of the soluble component. If a precipitate forms in a test solution which contains a phosphomethylolated amine compound, and if the solution contains no more than an uninhibited solution, it is considered to be 0% inhibited. If no precipitate forms in an inhibited test solution and it therefore contains all of its original cation content, it is considered to be 100% inhibited. Titration results intermediate to the 0% and 100% inhibition values are directly related to these extremes and converted to percent inhibition.

The invention will be understood more readily by reference to the following tables; however, these tables are intended to illustrate the invention and are not to be construed to limit the scope of the invention. In the tables, "$n$" defines $n$ as it appears in Formula II.

TABLE I.—INHIBITION OF SCALE FORMATION FROM A CaSO₄ SOLUTION AT 150° F. FOR 24 HOURS

[6,750 p.p.m. CaSO₄ (2.35×the equilibrium concentration —2,850 p.p.m.)]

| Methylene phos-phonated ethylene amine inhibitor | Salt | n | Conc. (p.p.m.) | Percent scale inhibition |
|---|---|---|---|---|
| Triamine | H | 2 | 0 | 0 |
|  | H | 2 | 0.55 | 23 |
|  | H | 2 | 1.60 | 49 |
|  | H | 2 | 2.15 | 97 |
|  | Na₅H₅ | 2 | 3.2 | 97 |
| Hexamine | H | 5 | 0.70 | 16 |
|  |  |  | 2.05 | 49 |
|  |  |  | 2.70 | 98 |
| Polyamine | H | 14 | 2.6 | 35 |
|  |  |  | 3.9 | 98 |
| Triamine | Ca₃Na₂H₂ | 2 | 5.0 | 100 |

TABLE II.—INHIBITION OF SCALE FORMATION FROM A CaCO₃ SOLUTION AT 150° F. FOR 24 HOURS

[98 p.p.m. CaCO₃ (3.9×equilibrium concentration 25 p.p.m. CaCO₃)]

| Inhibitor | Salt | n | Conc. (p.p.m.) | Percent scale inhibition |
|---|---|---|---|---|
| Triamine | H | 2 | 0 | 0 |
|  |  |  | 0.1 | 35 |
|  |  |  | 0.2 | 62 |
|  |  |  | 0.3 | 76 |
|  |  |  | 0.45 | 97 |
| Hexamine | H | 5 | 0.15 | 41 |
|  |  |  | 0.25 | 52 |
|  |  |  | 0.40 | 76 |
|  |  |  | 0.55 | 83 |
| Triamine | Zn₄H₂ | 2 | 0.8 | 89 |
|  |  |  | 1.6 | 100 |
| Hexamine | Zn₄H₄ | 5 | 0.5 | 17 |
|  |  |  | 2.0 | 90 |

TABLE III.—INHIBITION OF SCALE FORMATION FROM A BaSO₄ SOLUTION AT 150° F. FOR 24 HOURS

[56 p.p.m. BaSO₄ (8×equilibrium concentration)]

| Inhibitor | Salt | n | Conc (p.p.m) | Percent scale inhibition |
|---|---|---|---|---|
| Triamine | H | 2 | 0.45 | 100 |
| Hexamine | H | 5 | 0.60 | 62 |

TABLE IV.—INHIBITION OF SCALE FORMATION FROM A 3MgO2SiO₂2H₂O SOLUTION AT 150° F. FOR 24 HOURS

[53 p.p.m. 3MgO2SiO₂2H₂O (1.6×equilibrium concentration)]

| Inhibitor | Salt | n | Conc (p.p.m) | Percent scale inhibition |
|---|---|---|---|---|
| Triamine | H | 2 | 5.7 | 87 |
| Hexamine | H | 5 | 3.0 | 82 |

It should be noted that the effect of temperature in threshold inhibition of scale formation or deposition is significant, as many of the metallic salts become less soluble with rising temperatures.

Field applications generally subject scale inhibitors to less vigorous conditions than laboratory experiments. The concentrations of scale-forming or precipitating ions is found in practice to be generally lower than the laboratory concentrations. Moreover, the usual commercial procedure involves the continuous addition of fresh inhibitor to a dynamic scale-forming system. It will therefore be appreciated that the scale inhibitors of the present invention are commercially effective in lower concentrations and over longer storage periods than indicated by laboratory data.

Obviously many modifications and variations of the present invention are possible in the light of the above teachings. It is therefore to be understood that within the scope of the appended claims the invention may be practiced otherwise than as specifically described.

I claim:

1. A method of inhibiting the deposition of scale-forming alkaline earth metal compounds on a surface in contact with aqueous solutions of said compounds, comprising adding to said solutions a threshold amount of at least one scale inhibitor compound of the general formula:

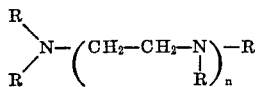

wherein each R is independently selected from the group consisting of hydrogen and

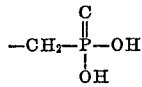

provided, however, that at least half of the radicals represented by R are

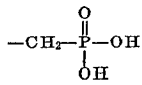

and $n$ is an integer of 2 to 14; and water-soluble salts thereof.

2. The process as claimed in claim 1 wherein said scale forming alkaline earth metal compounds are selected from the group consisting of alkaline earth metal carbonates, sulfates, oxalates, phosphates, fluorides and silicates.

3. The method as claimed in claim 2 wherein at least 80% of the radicals represented by R are

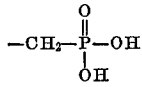

and water-soluble salts thereof.

4. The method as claimed in claim 2 wherein less than 100 p.p.m. of said compound is added to said solution.

5. The method as claimed in claim 2 wherein less than 25 p.p.m. of said compound is added to said solution.

6. The method as claimed in claim 2 wherein the inhibitor is a sodium salt.

7. The method of claim 2 wherein the weight ratio of said scale inhibitor compound to the cation components of said alkaline earth metal compounds does not exceed about 1.

8. The method as claimed in claim 2 wherein said scale inhibitor compound has the general formula:

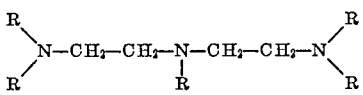

wherein each R is independently selected from the group consisting of hydrogen and

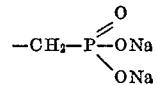

and at least four of the radicals represented by R are

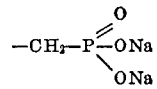

9. The method as claimed in claim 2 wherein said solutions are at a temperature of about 150 to about 350° F.

10. Method of claim 2 in which the inhibitor is in the form of a salt of an alkali metal, alkaline earth metal, ammonium, and zinc.

References Cited

UNITED STATES PATENTS

| | | | |
|---|---|---|---|
| 2,599,807 | 6/1952 | Bersworth | 260—500 |
| 2,841,611 | 7/1958 | Bersworth | 260—500 |
| 2,917,528 | 12/1959 | Ramsey et al. | 260—500 X |
| 3,160,632 | 12/1964 | Toy et al. | 252—180 |
| 3,234,124 | 2/1966 | Irani | 210—58 |

MICHAEL E. ROGERS, *Primary Examiner.*

U.S. Cl. X.R.

252—180; 260—500

UNITED STATES PATENT OFFICE
CERTIFICATE OF CORRECTION

March 25, 196

Patent No. 3,434,969

Paul H. Ralston

It is certified that error appears in the above identified patent and that said Letters Patent are hereby corrected as shown below:

Column 3, line 47, "all", first occurrence, should read -- add --. Col 5, line 48, "vary" should read -- very --. Column 7, line 27, "C" should read -- O --.

Signed and sealed this 14th day of April 1970.

(SEAL)

Attest:

Edward M. Fletcher, Jr.
Attesting Officer

WILLIAM E. SCHUYLER, J
Commissioner of Patent